Aug. 3, 1954 W. M. GRIMES, JR 2,685,671
APPARATUS FOR DETERMINING RELATIONSHIP BETWEEN
TUBE-NOISE AND ACCELERATION FORCES
Filed July 2, 1952
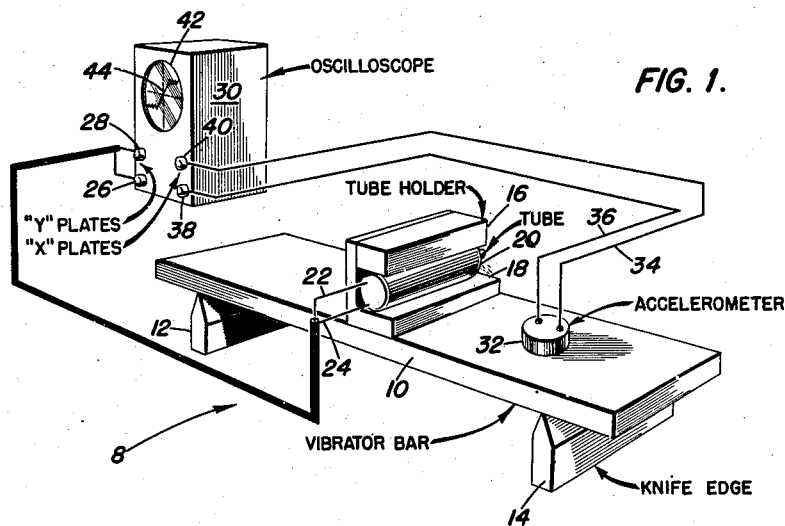
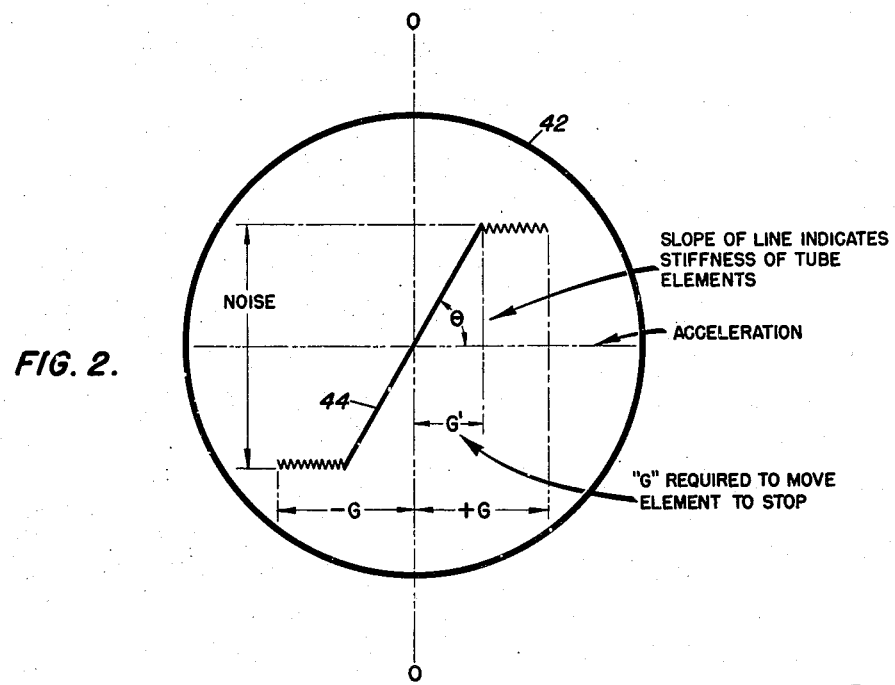
WILLARD M. GRIMES, JR.
INVENTOR
BY
ATTORNEYS Patented Aug. 3, 1954

2,685,671

UNITED STATES PATENT OFFICE 2,685,671

APPARATUS FOR DETERMINING RELATIONSHIP BETWEEN TUBE-NOISE AND ACCELERATION FORCES

Willard M. Grimes, Jr., Paterson, N. J., assignor to the United States of America as represented by the Secretary of the Navy Application July 2, 1952, Serial No. 296,971

3 Claims. (Cl. 324—20)

This invention relates, in general, to electronic testing equipment, and more particularly it relates to a method and apparatus for testing radio tubes that are to be used in aerial missiles and/or radio proximity fuzes in order to determine the relationship between tube-noise output and acceleration forces that such tubes might be subjected to in operational use.

When miniature or sub-miniature radio tubes are used in aerial missiles and proximity fuzes, these tubes are subjected to severe shocks and vibrations. It is important, therefore, that the tubes to be used are properly selected and will perform satisfactorily under such unusual operating conditions. Heretofore, no simple, reliable, and rapid way of testing tubes under extreme operating conditions has been available.

It is, therefore, one of the objects of this invention to provide a method and appartus for testing radio tubes and for yielding the desired information quickly as a visual trace on an oscilloscope screen.

Another object of this invention is to provide a method and apparatus for testing miniature and sub-miniature radio tubes that are to be used in aerial missiles and proximity fuzes in order to determine the relationship between noise output of the tube and acceleration.

Another object of this invention is to provide apparatus that is simple in construction, and reliable and efficient in operation, for determining certain characteristics of radio tubes that are to be used with aerial missiles and proximity fuzes.

Other objects and many of the attendant advantages of this invention will be readily appreciated as the same becomes better understood by reference to the following detailed description when considered in connection with the accompanying single drawing, and in which:

Fig. 1 is a schematic of the testing apparatus, embodying the features of the invention; and Fig. 2 is an enlarged view of the oscilloscope screen shown in Fig. 1.

According to the invention, a method and apparatus is provided for testing radio tubes to determine the relationship between tube-noise and acceleration forces that the tube will be subjected to in an aerial missile or proximity fuze. The apparatus includes a vibrator bar, a holder mounted on the vibrator bar to receive a radio tube to be tested, an accelerometer also mounted on the same bar as the tube and arranged to receive the same vibrations that the tube is subjected to, and an oscilloscope to which the noise output of the tube and the output of the accelerometer are fed. Connections are also provided to the oscilloscope so that the accelerometer's output deflects the oscilloscope beam in a direction perpendicular to that swept by the noise output of the tube.

For a more complete understanding of the invention, reference is now made to the figures of the drawing. In Fig. 1 there is shown the test equipment 8 which comprises a flat vibrator bar or member 10 mounted on two knife edge members 12 and 14. A tube holder 16 of the construction shown and having a recess 18 therein is mounted on vibrator bar 10, and it is used to hold a tube 20 to be tested therein. The outlet leads 22 and 24 of tube 20 are connected to the terminals 26 and 28 of the vertical plates of an oscilloscope 30.

An accelerometer 32 is also mounted on the vibrator bar 10 in order that it will be subjected to the same vibrations to which tube holder 16 will be subjected. The output of accelerometer 32 is fed through leads 34 and 36 to terminals 38 and 40 of the horizontal plates or amplifier of the oscilloscope 30.

When the vibrator bar 10 is vibrated by suitable means (not shown), the noise output from tube 20 is made to deflect the beam of the cathode ray oscilloscope in a given direction. The accelerometer 32 is, in the meantime, exposed to the same vibration experienced by the tube 20, and its output is made to deflect the beam of the cathode ray oscilloscope 30 in a direction perpendicular to that swept by the noise output. On the viewing screen 42 of oscilloscope 30 there is obtained the resulting pattern 44 caused by the outputs obtained from the tube 20 and accelerometer 32. The resultant pattern 44 indicates the relationship between the instanteous noise occurring in tube 20 and the acceleration forces in terms of "gravity."

If it is assumed that the tube noise sweeps the oscilloscope beam in the "Y" or vertical direction, and that the output of accelerometer 32 to the oscilloscope 30 sweeps the oscilloscope beam in the "X" or horizontal direction, then if the noise is proportional to acceleration, a straight line, such as shown by pattern 44, will appear on the screen 42 of the oscilloscope 30 and from this it may be inferred that elastic bending of the member being tested takes place. However, where there is an abrupt change in the slope of the curve, it may be inferred that the elastic member has been abruptly stopped. For example, this would be the case of a side rod free to move until it strikes the edge of a too large hole in a supporting mica.

Therefore, the slope of the pattern 44 indicates the stiffness of the elements causing noise. A steep slope of pattern 44 would indicate that the elements lack sufficient strength, while a flat slope of pattern 44 would indicate that the elements have rigidity.

In addition, the distance G' in Fig. 2, indicates the acceleration level at which the moving members are being restrained by other parts of the mounting arrangement. On the other hand, the vertical increment of the curve 44 indicates the noise associated with each phase of the vibration movement.

Inasmuch as the vibrator bar 10 has generally a frequency of sixty (60) cycles per second, a photograph can be made of the screen 42 with a one second exposure. Thus, by making a series of photographs, recorded information can be obtained about the noise developed by the members in terms of acceleration.

In operation, the vibrator bar 10 is generally vibrated at a rate of sixty (60) cycles per second. The output from the accelerometer 32 is fed to the horizontal plates, and the noise output of tube 20 is fed to the vertical plates of oscilloscope 30. The resulting pattern 44 is then analyzed for phase relation, and the ratio of noise output to acceleration for each given increment of acceleration within the shake cycle.

Obviously many modifications and variations of the present invention are possible in the light of the above teachings. It is, therefore, to be understood that within the scope of the appended claims the invention may be practiced otherwise than as specifically described.

What is claimed is:

1. Electronic apparatus for determining the relationship between the noise output of a radio tube and the acceleration forces that said tube is subjected to, comprising, vibratory means, means adapted to receive and hold said tube, said receiving and holding means being mounted on said vibratory means, accelerometer means mounted so as to be subjected to the same vibration as said tube, an oscilloscope to which the noise output of said tube and the output from said accelerometer means are fed, and suitable connections from said tube and said accelerometer means to said oscilloscope, whereby when said vibratory means is vibrated, the noise output from said tube and the output from said accelerometer means are fed to said oscilloscope so that the output from said accelerometer means deflects said oscilloscope in a direction perpendicular to that swept by the noise output from said tube.

2. Electronic testing apparatus for determining the relationship between the noise output of a radio tube and the acceleration forces that said tube is subjected to, comprising, vibratory means, means adapted to receive and hold said tube, said receiving means being mounted on said vibratory means, an accelerometer mounted so as to be subjected to the same vibration as said tube, an oscilloscope to which the noise output of said tube and the output from said accelerometer are fed, and suitable connections from said tube and said accelerometer to said oscilloscope, whereby when said vibratory means is vibrated, the noise output from said tube and the output from said accelerometer are fed to said oscilloscope so that the output from said accelerometer deflects said oscilloscope in a direction perpendicular to that swept by the noise output from said tube.

3. Electronic testing apparatus for determining the relationship between noise output of a radio tube and the acceleration forces that said tube is subjected to, comprising, a vibrator bar, a holder mounted on the vibrator bar to receive said radio tube, an accelerometer mounted so as to be subjected to the same vibration as said tube, an oscilloscope to which the noise output of said tube and the output of said accelerometer are fed, and suitable connections from said tube and said accelerometer to said oscilloscope, whereby when said vibrator bar is vibrated, the noise output from said tube and the output from said accelerometer are fed to said oscilloscope so that the output from said accelerometer deflects said oscilloscope in a direction perpendicular to that swept by the noise output from said tube.

References Cited in the file of this patent

UNITED STATES PATENTS

| Number | Name | Date |
| --- | --- | --- |
| 1,825,548 | Rockwood et al. | Sept. 29, 1931 |
| 2,535,091 | Quick | Dec. 26, 1950 |
| 2,562,917 | Hoyt | Aug. 7, 1951 |